US009397922B1

(12) United States Patent
Collins (10) Patent No.: US 9,397,922 B1
(45) Date of Patent: Jul. 19, 2016

(54) AUTOMATED NETWORK TESTING PLATFORM

(71) Applicant: Gregory Paul Collins, Powell, TN (US)

(72) Inventor: Gregory Paul Collins, Powell, TN (US)

(73) Assignee: EarthLink, LLC, Atlanta, GA (US)

( * ) Notice: Subject to any disclaimer, the term of this patent is extended or adjusted under 35 U.S.C. 154(b) by 467 days.

(21) Appl. No.: 13/780,223

(22) Filed: Feb. 28, 2013

(51) Int. Cl.
H04L 12/26 (2006.01)

(52) U.S. Cl.
CPC .............. *H04L 43/50* (2013.01); *H04L 43/06* (2013.01); *H04L 43/10* (2013.01)

(58) Field of Classification Search
CPC ..... H04L 12/26; H04L 12/2697; H04L 41/50; H04L 41/5003; H04L 41/5009; H04L 41/5038; H04L 43/50; H04L 12/4641; H04L 12/4675; H04L 43/00; H04L 43/06; H04L 43/08; H04L 43/0811; H04L 43/10; H04L 41/5019
USPC ......... 370/241, 248, 250, 252, 253, 242, 245; 709/223, 224
See application file for complete search history.

(56) References Cited

U.S. PATENT DOCUMENTS

| | | | | |
|---|---|---|---|---|
| 6,079,020 | A * | 6/2000 | Liu .................................. | 726/15 |
| 6,901,442 | B1 * | 5/2005 | Schwaller .......... | H04L 43/0817 709/223 |
| 7,447,167 | B2 * | 11/2008 | Nadeau ............... | H04L 12/2697 370/254 |
| 7,664,043 | B1 * | 2/2010 | D'Souza et al. ............... | 370/242 |
| 7,747,954 | B2 * | 6/2010 | Farid et al. .................... | 709/224 |
| 7,898,971 | B2 * | 3/2011 | Qian et al. .................... | 370/242 |
| 7,978,601 | B1 * | 7/2011 | Croak et al. .................. | 370/242 |
| 8,054,750 | B2 * | 11/2011 | Claise ................. | H04L 41/5003 370/217 |
| 8,213,871 | B1 * | 7/2012 | Cogan ..................... | H04L 43/50 379/14.01 |
| 8,762,548 | B1 * | 6/2014 | Kessel ................. | H04W 48/18 709/219 |
| 2004/0039970 | A1 * | 2/2004 | Barnard .............. | H04L 12/2697 714/43 |
| 2007/0140135 | A1 * | 6/2007 | Sheppard ...................... | 370/241 |
| 2008/0232379 | A1 * | 9/2008 | Mohamed et al. ........ | 370/395.53 |
| 2009/0143652 | A1 * | 6/2009 | Warburton .......... | G06F 19/3418 600/301 |
| 2009/0215447 | A1 * | 8/2009 | Catalano ............... | H04W 48/18 455/432.1 |
| 2009/0279673 | A1 * | 11/2009 | Maffre et al. ................. | 370/241 |
| 2010/0153055 | A1 * | 6/2010 | Mucha ................ | H04L 12/2697 702/122 |
| 2011/0320588 | A1 * | 12/2011 | Raleigh ............... | H04W 36/245 709/224 |

* cited by examiner

*Primary Examiner* — Vivek Srivastava
*Assistant Examiner* — William C McBeth
(74) *Attorney, Agent, or Firm* — King & Spalding LLP (57) ABSTRACT

An automated network testing platform may comprise a network testing server. The network testing server may receive a first input that characterizes a customer network for which a network test is to be performed. Further, the network testing server may receive a second input representative of the type of network test to be performed. Responsive to receiving the first and the second input the network testing server may identify a test point that is available to execute the network test. Upon identifying the available test point, the network testing server may reconfigure the available test point into the customer network. Further, the network testing server may instruct the reconfigured test point to execute the network test. Once the network test is completed, the network testing server may receive the test results from the reconfigured test point, analyze and interpret the test results, and present the test results to a user.

20 Claims, 7 Drawing Sheets

AUTOMATED NETWORK TESTING PLATFORM

FIELD OF INVENTION

This edisclosure relates generally to a technical field of computer networks and, in one example embodiment, to a system, method and an apparatus for automated network testing platform.

BACKGROUND

Network service providers may enter into service agreements with business entities. The service agreements may outline the network services that a service provider may provide a business entity. Further, the service agreements may include a commitment of the service provider to maintain a minimum quality of service for each of the network services provided to the business entity. For example, a service provider may provide a 3 Mega bits per second (Mbps) network connection to a business entity and guarantee a minimum of 2 Mbps for voice data at any given time.

To meet the commitment that the service provider has made in the service agreement, the service provider may have to test the network periodically or at least before initiating the network service. Conventional technology for network testing may be limited to smaller testing environments. For example, the test infrastructure may be designed for lab environment or smaller network environments. Therefore, conventional technology may not be adapted for large production environment that include a number of business entities that may have thousands of network devices. Further, conventional technology includes a user manually configuring and reconfiguring each network device for each network testing request per customer. Such manual configuration and reconfiguration of network devices may be labor intensive and prone to human error that may result in failing to meet the commitment quite frequently. Failing to meet the commitment may cost the service provider to lose business. Thus, there is a need for a technology that provides an efficient automated network testing platform.

SUMMARY

In one embodiment, a method of an automated network testing platform includes receiving a first user input. The first user input can be representative of a customer network identifier. The customer network identifier can identify a network associated with a network test. Further, the method includes receiving a second user input. The second user input can be representative of a type of the network test that is to be performed on the network. Upon receipt of at least one of the inputs or both the inputs, the method includes identifying a test point that is available to perform the network test. The test point that is available for the network test can be identified from a plurality of test points based on the first user input and the second user input. Further, the method includes reconfiguring the available test point to be a part of a customer network. Once the test point is reconfigured, the method includes instructing the reconfigured test point to perform the network test. Upon completion of the network test or while the network test is being executed, the method includes receiving an output representative of a result or a portion of the result of the network test from the reconfigured test point. In addition, the method includes presenting the output to a user.

In another embodiment, a system of an automated network testing platform includes a computer that can receive a first user input representative of a customer network identifier associated with a network test. Further, the computer can receive a second user input representative of a type of the network test to be performed. Once the computer has received the inputs, based on the first user input and the second user input, the computer can identify a test point that is available to perform the network test from a plurality of test points. Further, the computer can reconfigure the available test point to be a part of a customer network and instruct the reconfigured test point to perform the network test. Based on a completion of the network test the computer can receive an output representative of a result of the network test from the reconfigured test point. Further, the computer can present the output to a user. In addition to presenting the output, in some example embodiments, the computer can present a progress of the network test and a result of the network test at each point of the progress of the network test.

In yet another embodiment, an automated network testing platform computer includes a memory; and a processor that can receive a first user input representative of a customer network identifier associated with a network test. Based on the first input, the processor can determine a type of the network test to be performed. Further, based on the first user input and the type of network test, the processor can identify a test point that is available to perform the network test from a plurality of test points. In addition, the processor can reconfigure the available test point to be a part of a customer network and instruct the reconfigured test point to perform the network test. The processor can receive an output representative of a result of the network test from the reconfigured test point. Further, the processor can generate a suggestion associated with the received output by analyzing the received output that is representative of the network test. The suggestion can be representative of subsequent steps that are to be followed based on the result of the network test.

The foregoing discussion of the automated network testing platform is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

Example embodiments are illustrated by way of example and not limitation in the figures of the accompanying drawings, in which.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for automated network testing platform. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

The term 'test point' as used herein may generally refer to a computing device that may be adapted to comprise and to execute a set of instructions associated with testing a network. In an example embodiment, the computing device may be a physical computing device. Further, in some embodiments, the computing device may be a server computing device. For example, the test point may be a Windows 7 server that comprises testing software and the server may execute the test software to test one or more parameters of the network as required. Representative examples of tests that can be performed on a network can include, but is not limited to, determining if a network if functioning as provisioned, checking the network throughput, testing the network speed, testing for congestion in the network, testing a first mile connection, last mile connection and core network, testing the network delay and/or testing operation of network services. In an example embodiment, the network may be a virtual private network (VPN). One of ordinary skill in the art can understand and appreciate that VPN's may be described herein merely for explanatory purposes and is not meant to limit the scope of the appended claims. Further, one of ordinary skill in the art can understand and appreciate that the VPN may be replaced by any other appropriate type of network.

Figure 1:
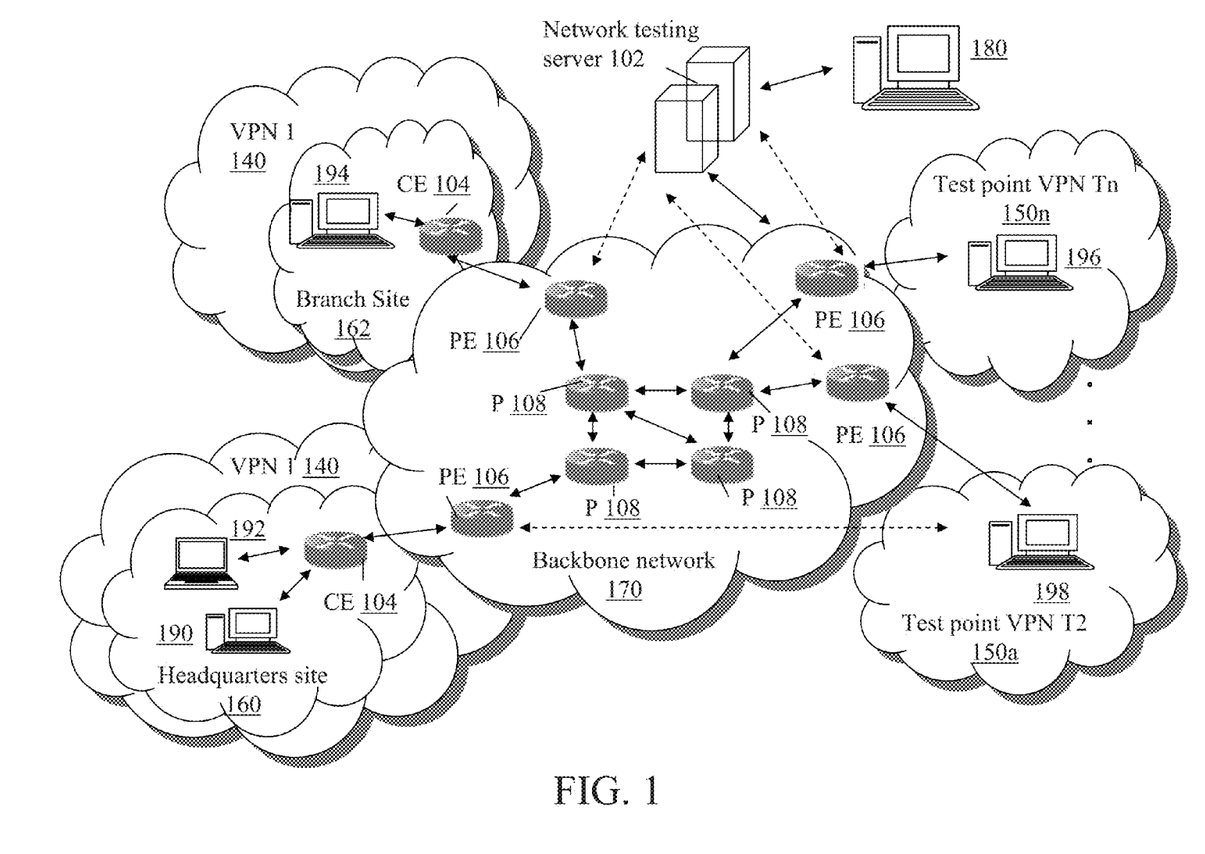
FIG. 1 illustrates an exemplary automated network testing system, according to certain exemplary embodiments of the present invention.
Figure 2:
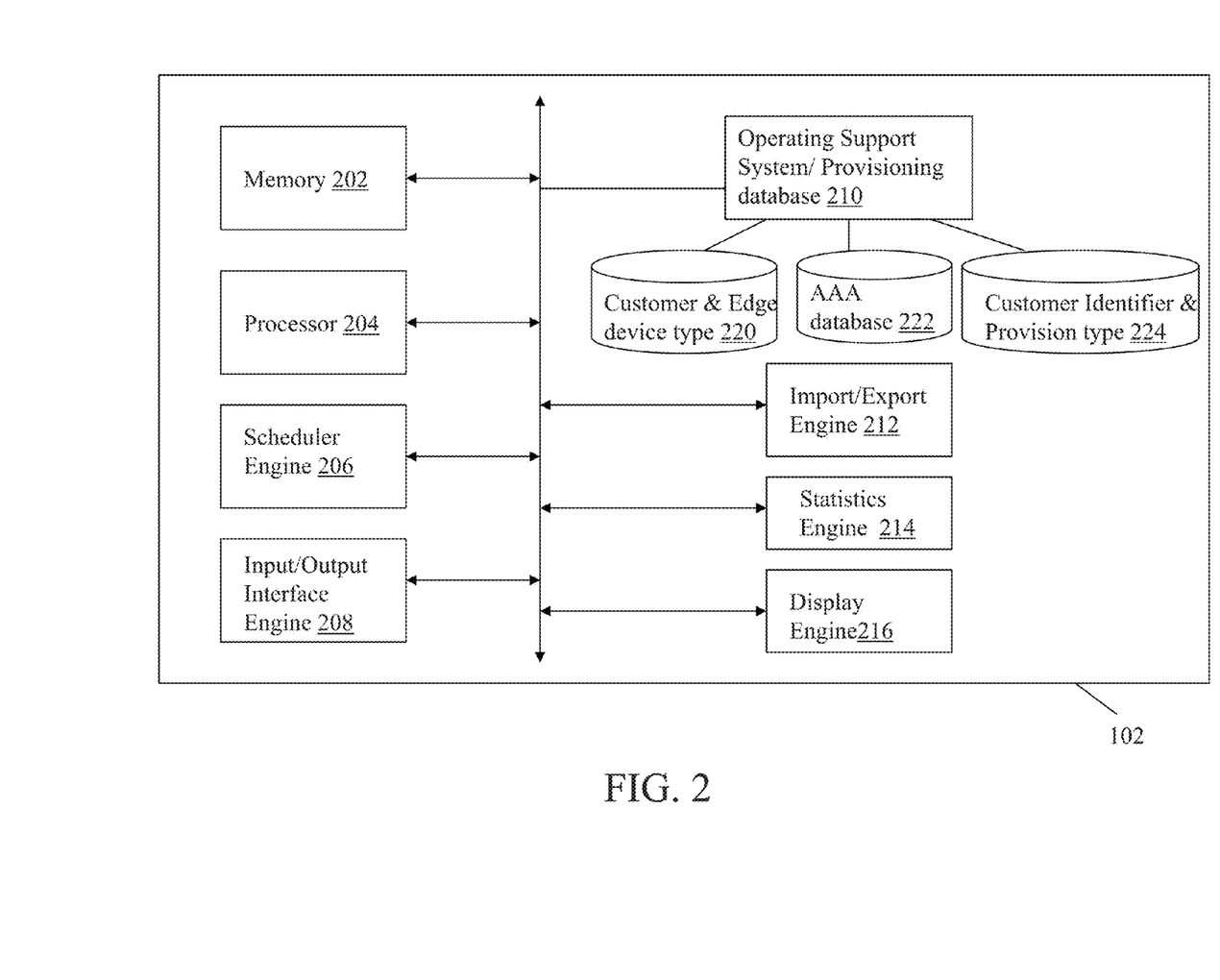
FIG. 2 illustrates a functional block diagram of the automated network testing server, according to certain exemplary embodiments of the present invention.

Technology for automated network testing platform will now be described in greater detail with reference to FIGS. 1-7, which describe representative embodiments of the present invention. FIGS. 1 and 2 describe the automated network testing system, as an exemplary embodiment of an operational environment of the automated network testing system. FIGS. 3-7 describe the different embodiments of automated network testing system using suitable illustrations and flowcharts.

The automated network testing system may include a network testing server that provides an integrated platform for automating various tests on a network to ensure a quality of the network services provided to a customer. The network testing server may be remotely accessible through a computing device. In one example embodiment, a network technician may access the network testing server from a remote location via a mobile computing device. In another example embodiment, the network technician may access the network testing server by coupling a personal computing device directly to the testing server. In yet another example embodiment, the network testing server may be pre-installed with an input/output device that can be used to access the applications of the testing server.

In one or more embodiments, the network testing server may provide a user interface that may be accessible through any appropriate computing device as described above. The user interface may include data fields that are adapted to receive data from a user. In an example embodiment, the data may include a customer identifier data, a network data and/or the type of network test to be executed. In one embodiment, the user interface may provide a user with a predefined list of network tests to choose from and the user may select the type of network test from the list of predefined test. In another embodiment, the user may enter data that identifies a customer and/or the customer network. Responsive to receiving the data that identifies a customer and/or the customer network, the network testing serve may determine the type of network test for the customer based on the customer identifier data and/or the network data. For example, the user may enter a customer account number and responsive to receiving the customer account number, the network testing server may collect additional data associated with the network such as, inter alia, the network provisioning data for the customer and/or the network equipment used to provide the requested network services. Continuing with the example, based on the additional data, the network testing server may automatically choose a subset of tests from a larger set of tests for the specific customer, and prompt/instruct the user to execute the subset of tests chosen for the specific customer. In one example embodiment, only the subset of tests may be highlighted and the other tests may be grayed out. One of ordinary skill in the art can understand and appreciate that the subset of tests may be presented to the user by any other appropriate means as well.

Responsive to receiving data representative of the type of network test, either by a user selection of the type of network test or an automatic determination by the network testing server, the network testing server may identify a test point that is available at that given time for executing the network test. In addition, the network testing server may manage the scheduling of network tests with the test points i.e., the network testing server may coordinate the assignment of each network test to each test point based on a set of criterion. The scheduling criterion may include, but is not limited to, availability of the test points, the capability of the test points, resources available at the test point, the type of network test, the customer, and/or time taken by the test point to execute the test.

In an example embodiment, the network for which the test is to be executed i.e., the customer network and the network in which the test point is disposed may be different private networks. The two distinct private networks may not share data with each other unless configured to do so. So, once the test point it identified, the network testing server may reconfigure the test point to be a part of the customer network for which the test is to be executed. Responsive to reconfiguring the test point, the network testing server may instruct the test points to execute the network test and provide an output. In addition, the network testing server may be configured to analyze the output and provide the analysis result to the user.

In another embodiment, the network testing server may be configured to provide recommendations to the user based on the analysis.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss the figures further, an exemplary embodiment of the present invention will be described in detail. First, FIG. 1 will be discussed in the context of describing a representative operating environment associated with automated network testing according to certain exemplary embodiments of the present invention. FIGS. 2-7 will be discussed, making exemplary reference back to FIG. 1 as may be appropriate or helpful.

As further discussed below and in accordance with certain embodiments of the present invention, FIG. 1 illustrates an exemplary system that is useful for automated network testing; while FIG. 2 illustrates exemplary system elements such as a network testing server and FIGS. 3-7 illustrate exemplary flow charts representing operation of the system.

Referring now to FIG. 1, this figure illustrates an exemplary automated network testing system, according to certain exemplary embodiments of the present invention. In particular, FIG. 1 illustrates a virtual private network (VPN) 140, a branch site 162, a customer headquarter site 160, computing devices 190-194, customer edge device 104, provider edge device 106, provider device 108, a provider backbone network 170, test point VPN's 150a-150n, test point computing devices 196-198, a network testing server 102, and a remote computing device 180.

In an example embodiment of FIG. 1, a business entity may include the headquarters site 160 and a branch site 162. In another embodiment, the business entity may have one or more headquarters sites and branch sites, wherein the different sites may be spread across different geographical locations (e.g., regions, countries). Further, each site may be communicatively coupled to a public network, such as the Internet.

In one embodiment, the headquarters site 160 may include multiple computing devices that may be communicatively coupled to each other over one or more local area network (LAN) connections. Further, the LAN's may be configured communicatively couple the headquarters site 160 with a public network, such as the Internet. Representative examples of the computing devices at the headquarters site may include, but is not limited to, desktops 190, laptops 192, mobile computing devices (not shown in Figures), routers, and/or switches. In addition, the headquarters site 160 may include an edge device, such as a customer edge device 104. The customer edge device 140 may be a networking device, such as a router or a switch that may be configured to communicatively couple the multiple computing devices within the LAN of the headquarters site 160 to a public network or any other appropriate network.

In an embodiment of FIG. 1, as described-above for the headquarters site 160, the branch site 162 may include multiple computing devices (e.g., computing device 194) that may be communicatively coupled to each other over one or more LAN's and coupled to a public network via the customer edge device 104 at the branch site 162. In one embodiment, the headquarters site 160 and the branch site 162 may be coupled to a public network over a DSL network, a T1 line, a DS3/T3 line, a wireless network, or any other appropriate network technology as provided by a network service provider (e.g., an Internet Service Provider (ISP)).

In one embodiment, the different sites i.e., the headquarters site 160 and branch site 162 may operate as a secure private network comprising one or more LANs that communicatively couple a number of computing devices within each site. One of ordinary skill in the art can understand and appreciate that private network as described herein may refer to physical computer network or a virtual network. In one embodiment, the different secure private networks may not communicate with each other unless they are configured to do so. However, in one or more embodiments, the different sites may have to communicate with each other exchange data from one site to another. For example, a user in a headquarters site 160 may have to access network resources available in one of the branch sites (e.g., branch site 162). In another example, a user in a branch site 162 may have to access an enterprise application at or transfer a file to the headquarters site 162.

In one embodiment, the different sites may be communicatively coupled to each other via an enterprise private network, for example, using a leased line. In another embodiment, a secure connection can be established between the different sites via a VPN connection. A VPN may establish secure communication between the different sites (e.g., branch site 162 and headquarters site 160) over a public network. Each VPN connection may be uniquely identified by a VPN identifier, such as a route distinguisher (RD) and/or each VPN may be represented by a VPN number. For example, as illustrated in FIG. 1, VPN 1 140 may refer to the VPN connection between the headquarters site 160 and the branch site 162. In another example, VPN n may refer to a VPN connection between the headquarters site 160 and the n-th branch site (not shown in the Figure). In an example embodiment, the VPN may be provided by the network service provider over any appropriate network technology, such as DSL, T1 line, T3 line, wireless network, and/or the like.

As described above, for secure communication, the headquarters site 160 and the branch site 162 may be communicatively coupled by a VPN through a provider backbone network 170. In an example embodiment, the provider backbone network 170 may be a wide area network (WAN) that may be operated by a network service provide (e.g., ISP). In one embodiment, the provider backbone network 170 may be configured to manage traffic to and from multiple sites using a combination of one or more network devices that are configured to route traffic to their respective destinations. In an example embodiment, the network devices may refer to network infrastructure devices, such as hubs, switches, routers, gateways, and/or wireless access devices.

In an example embodiment of FIG. 1, the provider backbone network 170 may include one or more provider edge (PE) devices 106 and/or one or more provider (P) devices 108. The PE device 106 may be a network device at the edge of the provider backbone network 170 that is coupled to the customer network (e.g., headquarters site 160, branch site 162, etc.) through the customer edge device 104. In addition, the PE device 106 may be coupled to one or more P devices 108 in the provider backbone network 170. The P device 108 may be network infrastructure devices that operate inside the provider's core network and does not directly interface to any customer endpoint. A combination of PE devices and P devices may be used to transport traffic between different private networks over the provider backbone network 170.

Further, each PE device 106 and P device 108 may be provisioned to provide desired network services to a business entity.

In an example embodiment, a business entity and a network service provider may enter an agreement regarding network services desired by the business entity. In the agreement, the service provider may promise a minimum quality of service on each network service to the business entity. For example, the network service may be a 3 Mbps connection to a branch site 162, wherein 3 Mbps may include a guaranteed 2 Mbps for voice data and 1 Mbps for other data. Based on requirements and the conditions in the agreement, the network service provider may provision/configure the network devices in the provider backbone network 170 to provide the promised network service to the business entity. For example, the network service provider may have to configure the PE device 106 is communicatively coupled to the CE device 104 of the branch site 162. Once the network has been provisioned, the network may have to be tested to ensure that the network is performing as provisioned and to ensure the promised quality of service. In one embodiment, the quality of service and provisioning of the network may be tested using an automated network testing system as illustrated in FIG. 1. One of ordinary skill in the art can understand and appreciate that the automated network testing system is not limited to testing network provisioning and quality of service, but can be used to perform any appropriate network related tests.

In one embodiment, the automated network testing system as illustrated in FIG. 1 may include one or more test points 196-198 that are deployed throughout the network. In one embodiment, the test points may be operated by the network provider. In another embodiment, the test points may be operated by a third party entity. In an example embodiment, each test point may be located in their respective private networks that are separate from each other and are separate from the private network of the headquarter site 160 and the branch site 162. Further, the test points 196-198 may be communicatively coupled to respective PE devices (e.g., PE device 110) in the provider backbone network 170.

In addition to the test points 196-198, the automated network testing system may include a network testing server 102. The network testing server 102 can be communicatively coupled to the provider backbone network 170 via the PE device 106. In an example embodiment, the network testing server 102 may be web server. Accordingly, the network server device 102 may provide a web interface to a user through which the user can initiate and/or execute network tests. In one embodiment, the user may access the web interface from a remote location through a remote computing device 180.

In one embodiment, the web interface may include one or more data fields that are adapted to receive user input. Representative examples of the data fields provided in the web interface may include, but is not limited to, customer network identifier, VPN identifier, and/or Internet Protocol (IP) address of a computing device at the customer end point against which the test is conducted. Further, the data fields can receive input representative of the type of network test to be performed. One of ordinary skill in the art can understand and appreciate that above-listed examples of data field are not exhaustive and the web interface may have any number of additional data fields that may be useful for characterizing and identifying a network and determining the type of test to be executed on the network. The web interface and the different data fields may be described below in greater detail, in association with FIG. 3. Once the user input has been populated in the data fields, the user input may be forwarded to the network testing server 102.

In one embodiment, upon receiving the user input, the network testing server 102 may determine if there are any network tests that are specific to the customer based on the customer information. In another embodiment, upon receiving the user input, the network testing server 102 may determine additional information associated with the customer network and select a subset of network tests that the network server identifies as optimal for the customer network based on the additional information. In yet another embodiment, the network testing server 102 may receive the type of network test to be executed via the user input.

Upon determining the type of network test to be executed, the network testing server 102 may identify a test point (e.g., test point 196-198) that is available to execute the test at that given time. In one embodiment, if none of the test points 196-198 are available, the network testing server 102 may wait till a test point becomes available. In another embodiment, if none of the test points 196-198 are available, the network testing server 102 may schedule the network test for a later time. Since the private network in which the test points are located is separate from the private customer network for which the test is to be executed, once the network testing server 102 identifies an available test point (e.g., test point 196-198), the network testing server 102 may have to reconfigure the available test point such that the available test point is made a part of the customer private network. The reconfiguration process will be explained below in further detail, in association with the description of FIG. 6.

Once the available test point (e.g., test point 198) has been reconfigured into the customer private network VPN 1 140, the network testing server 102 may instruct the test point and a computing device at the customer end point to execute the network test. Further, when the test is over, the network testing server 102 may receive an output of the network test, analyze the output, generate statistical data from the output and present the output to the user. The network testing server 102 and its operation may be explained in further detail in association with FIG. 2 and FIGS. 3-6.

Turning now to FIG. 2, FIG. 2 illustrates a functional block diagram of the network testing server 102, according to certain exemplary embodiments of the present invention. In particular, FIG. 2 illustrates a memory 202, a processor 204, a scheduler engine 206, an input/output interface engine 208, an operational support system 210, an import/export engine 212, a statistics engine 214, a display engine 216, a customer and edge device type database 220, a authentication, authorization, and accounting (AAA) database 222, a customer identifier and provisioning type database 224.

In one embodiment, the processor 204 can be a multi-core processor. In another embodiment, the processor 204 can be a combination of multiple single core processors. In one embodiment, the network testing server 102 can include a memory 202 coupled to the processor 204. The memory 202 can be non-transitory storage medium, in one embodiment. The memory 202 can include instructions. The processor 204 can execute the instructions to perform operations of the network testing server 102. In other words, operations associated with the different modules/engines of the network testing server 102 can be executed using the processor 204. In one embodiment, the network testing server 102 can include one or more data processing devices such as computers mounted on a rack.

In an exemplary embodiment, a user can access the network testing server 102 through the web interface. The web interface may be an interactive web page and as described above in association with FIG. 1, the web interface may include data fields configured to receive user input. In one embodiment, the web interface may include a trigger embedded within the web interface to transmit data entered by a user. The trigger may include, but not limited to, a submit button, a next page button, entering a digital signature, and the like. In another embodiment, the web interface may transmit the data entered by the user as and when the data is entered.

In one embodiment, the input/output interface engine 208 may be configured to provide the web interface to the user. Further, the input/output interface engine 208 may be configured to manage a user interaction with the web interface. In an example embodiment, once the user input has been entered, the input/output interface engine 208 may be configured to receive the user input. Upon receiving the user input, the input/output interface engine 208 may process and format the user input to a form compatible with the network testing server 102. Further, the input/output interface engine 208 may process and format the user input to identify information that is relevant to execute the network test. Responsive to processing and formatting the user input, the input/output interface engine 208 may forward the user input to the operating support system 210.

In one embodiment, the operating support system 210 may receive the user input or the processed information from the input/output interface engine 208. One of ordinary skill in the art can understand and appreciate that the term operating support system 210 used herein may refer to the provisioning database and may be used interchangeably. The operating support system 210 as described herein may generally refer to a database. In an example embodiment, the operating support system 210 may be a database that includes any appropriate information of a customer. Representative examples of information included in the operating support system 210 may include, but is not limited to, circuit type, product data, customer name and address, circuit provisioning data, customer equipment, provisioning equipment. In other words, the operating support system 210 may provide information of who the customer is and their network service details. In another example embodiment, the operating support system 210 may include a customer and edge device type database 220, an AAA database 222, and a customer identifier and network provisioning database 224. Each of these databases may include information related to the network services used by the customer and the network devices (e.g., customer premise routers, PE devices, etc.) used to provide the network service. Further each of the database described above may include, without being exhaustive, information regarding the customer such as customer name, customer identifier, customer billing details, customer network restrictions, customer service details, and/or customer quality of service agreements.

Upon receiving the user input or the processed information from the input/output interface engine 208, the operating support system 210 may retrieve additional information regarding the customer. Further, the operating support system 210 may forward the additional information to the processor 204. Upon receiving the additional information, the processor 204 may be configured to select a subset of network tests that are specific to a customer from a list of network tests based on the additional information. The list of network tests may be maintained in the memory 202. Further, the list of network tests that are available depends on the type of network tests supported by the test points 196-198. Once the subset is determined, the processor 204 may forward the subset of network tests to a display engine 216. The display engine 216 may be configured to display the subset of network tests to a user. Further, the display engine 216 may be configured to prompt the user to select one or more network test from the subset of network tests that are specific to the customer.

In another embodiment, the web interface may include a data field representative of all the type of network tests that are available in the automated network tests system. For example, the web interface may provide a data field with a drop down menu that lists all the available network tests. Further, the user may select one or more network tests from the full list of network tests available in the automated network tests system rather than selecting from a subset of network tests specific to the customer. In other words, a user may be provided either with an exhaustive list of network tests available at the automated network testing system or the user may be provided with a filtered list of network tests that are specific to a customer. The filtered list may be generated by the network testing server 102 based on customer information.

In one or more embodiments, the input/output interface engine 208 may receive data representative of the type of network test selected by the user from the web interface. Upon receiving the type of network test to be executed, the input/output interface engine 208 may forward the data representative of the type of network test to the scheduler engine 206.

Upon receiving the data representative of the type of network test, the scheduler engine 206 may identify one or more test points that are available to execute the test. In one embodiment, the scheduler engine 206 may maintain a list of test points 196-198 and the status of each of the test points. In one embodiment, the test points 196-198 may be configured to periodically transmit status a status message to the network testing engine 206, wherein the input/output interface engine 208 may receive the status message and forward the status message to the scheduler engine 206. In another embodiment, the scheduler engine 206 may be configured to transmit a status check message to each of the test points 196-198 on the network. Responsive to receiving the status check message, the test points 196-198 may respond back with a status message. The status message may include, but is not limited to, information about any current tests being executed on each of the test points, information about time taken to complete a current test, information about when the test point will be available, and the like. In another embodiment, upon receiving the data representative of the type of network test, the scheduler engine 206 may check for availability of a test point in real time. In an example embodiment, the scheduler engine 206 may facilitate the assignment of requested network tests to specific test points 196-198. In addition, the scheduler engine 206 may maintain a queue of all the network test requests. Further, the scheduler engine 206 may prioritize the requests in the queue based on customer information, the critical nature of the network test request and/or availability of test point resources. One of ordinary skill in the art can understand and appreciate that the above-mentioned list of events based on which the queue is prioritized is not exhaustive and any number of additional events may be used individually or in combination to prioritize the requests in the queue.

Once an available test point has been identified, the scheduler engine 206 may forward the information regarding the available test point (e.g., test point 196-198) to the import/export engine 212. Further, the import/export engine 212 may reconfigure the available test point into the customer network for which the network test is to be executed such that the available test point is a part of the customer network. In one embodiment, the test point may be reconfigured by exchanging routing tables between PE devices 110 to which the test point is coupled and the PE device 106 to which the CE device 104 associated with the customer network is coupled. The reconfiguration of the test point into the customer network is described in greater detail below, in association with FIG. 6.

Responsive to reconfiguring the available test point into the customer network, the import/export engine 212 may issue instructions to the test point to execute the network test as selected by the user. Accordingly, the test point may be configured to simulate traffic such as voice and/or data traffic between the test point and a computing device at the customer end point.

Once the network test is executed, the test parameters are analyzed by the statistics engine 214. The statistics engine 214 may analyze an output of the network test and generate network statistics information. Further, the network statistics information may be forwarded to the display engine 216, wherein the display engine 216 may change the statistics data and/or the output of the network test into a visual format, auditory format, and/or a tactile format that is comprehensible to the user. Further, the formatted output or statistics information is presented to the user by the input/output interface engine 208. In an example embodiment, a desired output format may be selected by the user. In addition, the statistics engine can analyze the output and generate suggestions or provide the next step that the user needs to take based on the output. The operations of the network testing server 102 may be described in further detail below, in association with FIGS. 3-6.

Although specific operations are disclosed in the flowcharts illustrated in FIGS. 3-6, such operations are exemplary. That is, embodiments of the present invention are well suited to performing various other operations or variations of the operations recited in the flowcharts. It is appreciated that the operations in the flowcharts illustrated in FIGS. 3-6 may be performed in an order different than presented, and that not all of the operations in the flowcharts may be performed.

All, or a portion of, the embodiments described by the flowcharts illustrated in FIGS. 3-6 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Figure 3:
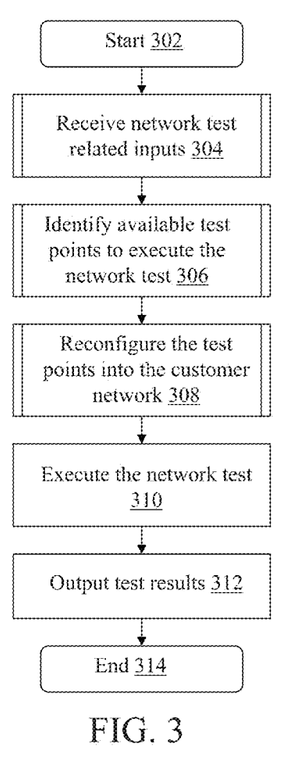
FIG. 3 is a flow chart that illustrates a process of executing an automated test, according to certain exemplary embodiments of the present invention.

Now turning to FIG. 3, FIG. 3 is a flow chart that illustrates a process of executing an automated test, according to certain exemplary embodiments of the present invention. In one embodiment, the input/output interface engine 208 of the network testing server 102 may provide a web interface to the user. The web interface may include data fields that are adapted to receive user input. Upon accessing the web interface, the user may populate the data fields. In one embodiment, the data fields may include a space where the user can input information. Further, the data fields may include a drop down menu from which user can make selections. In addition, the web interface may be adapted to recognize voice based information and populate the data fields based on the voice data.

As described above in association with FIGS. 1 and 2, in one embodiment, the web interface may include data fields representative of the customer information and type of network test to be executed for the customer. In another embodiment, the data field representative with the type of network test may be absent. In the embodiment where the data field representative of the type of network test is absent, the network testing server 102 may automatically select a network test for the customer based on the customer information.

In one example embodiment, the web interface may include one or more data fields adapted to receive user input that characterized the customer or the customer network for which the test is to be executed. In another embodiment, the web interface may be configured to provide one or more options to a user to control the network test. The controls provided to the user may correspond to the network test control features available at the test points. For example, if a test point includes a feature that can control an extent of time for which the test can be conducted; a corresponding option may be provided at the web interface where the user can enter the time duration for which the test is to be executed. In another example embodiment, the web interface may be configured to provide options to the user to configure the presentation of the result of the network test. For example, the user can initially set display parameters such that the result may be displayed in the form of a report, or in the form of graphs, or the like. In a further example embodiment, the web interface may be configured to provide options to the user to access the test point. For example, the web interface may include a login option where the user can enter a username and password to access features available at the test point. One of ordinary skill in the art can understand and appreciate that the web interface may include numerous other data field and options for the user.

In one embodiment, once the user has entered the data, the user populated data may be transmitted to the network testing server 102 from the web interface. The user populated data may be transmitted upon receiving a trigger from a user. For example, the user may click a submit button after populating the data fields. In another embodiment, the user populated data may be transmitted to the network testing server 102 as and when the data field is populated.

The process of executing an automated test starts at operation 302 and proceeds to operation 304. In operation 304, the input/output interface engine 208 may receive a network test related input from a user. The operation of receiving the network test related input from the user may be further described below, in association with FIG. 4.

Figure 4:
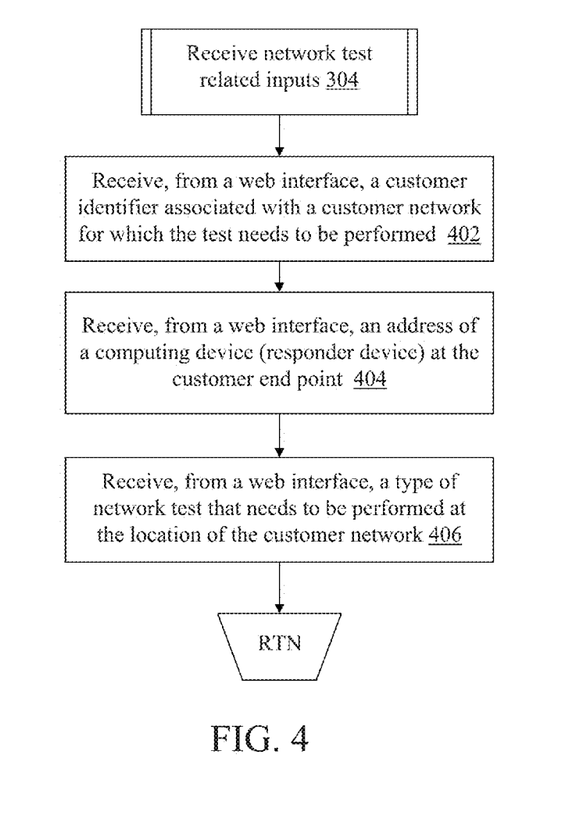
FIG. 4 is a flow chart that illustrates a process of receiving network test related inputs, according to certain exemplary embodiments of the present invention.

Turning now to FIG. 4, FIG. 4 is a flow chart that illustrates a process of receiving test related inputs, according to certain exemplary embodiments of the present invention. In operation 402, the input/output interface engine 208 may receive, from the web interface, a customer identifier associated with a customer network for which the network test is to be performed. In an example embodiment, the customer identifier may uniquely identify a customer and the network service associated with the customer. In addition to the customer identifier, in operation 404, the input/output interface engine 208 may receive an address that identifies a computing device (not shown in Figure) that is coupled to the CE device 104 at the customer network where the network test is to be performed and against which the network test is conducted. The computer device against which the test is conducted may be a responder device that receives the simulated test traffic and responds back to the test point to study the characteristics of the network. In one embodiment, the computing device may be a part of the customer site equipment. In another embodiment, the computing device may be installed by the entity that performs the test specifically for purposes of conducting the test. The address associated with the computing device at the customer end point may include an IP address, a MAC address and/or any other appropriate address that uniquely identifies the said computing device coupled to the CE device 104.

Further, in operation 406, the input/output interface engine 208 may receive, from the web interface, data representative of the type of network test that is to be performed for the customer. As described above in association with FIG. 2, a user may choose the type of network test from an exhaustive list of network tests, the user may choose the type of network test from a subset of network tests that is generated by the network testing device 102 based on the customer information, or the type of network test can be automatically selected by the network testing server 102 based on the customer information. In the embodiment where the type of network test is automatically selected by the network testing server 102, operation 406 may be omitted without departing from the broader spirit of the disclosure.

In addition to the data representative of customer information and/or the type of network test, the input/output interface engine 208 may be configured to receive other data from the web interface, for example data representative of the users choice of presentation format of the network test output, and the like. Further, the network testing server 102 may save the received data in a database for later reference. Once, the input/output interface engine 208 has received the user populated data from the web interface, the process of executing the automated test proceeds to operation 306.

Referring back to FIG. 3, in operation 306, the network testing server 102 may process the data received from the web interface to identify an available test point to execute the network test for the customer network based on the received data. The process of operation 306, wherein the network testing server 102 identifies the available test point is described in further detail below, in association with FIG. 5.

Figure 5:
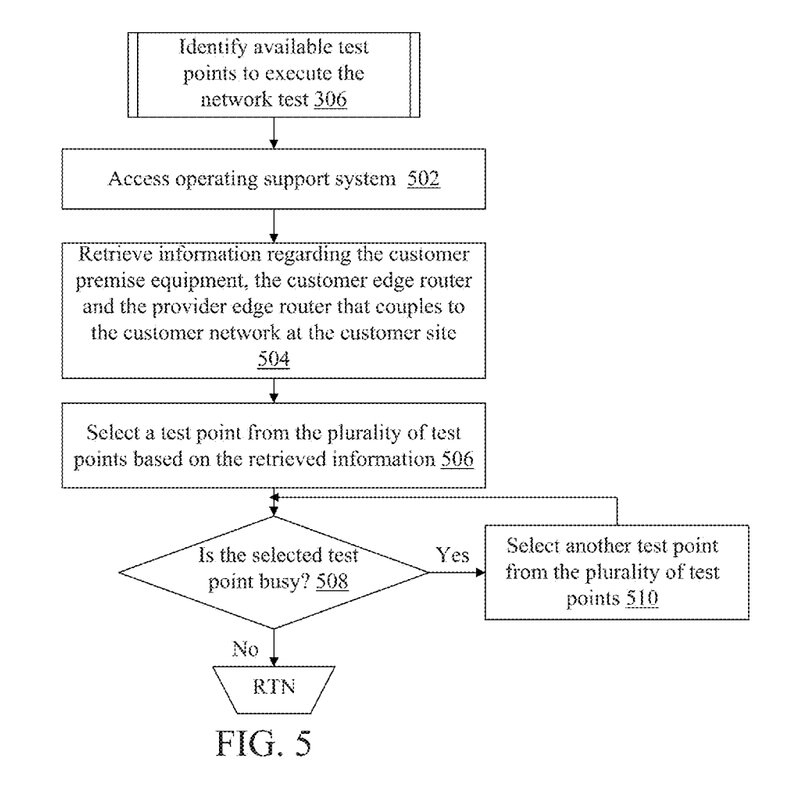
FIG. 5 is a flow chart that illustrates a process of identifying available test points, according to certain exemplary embodiments of the present invention.

Turning to FIG. 5, FIG. 5 illustrates a flow chart process of identifying available test points, according to certain exemplary embodiments of the present invention. In one embodiment, responsive to receiving the user populated data, the input/output interface engine 208 may process and format the received user populated data. Further, the processed data (or unprocessed data) may be forwarded to a provisioning database (herein, "operating support system 210"). In operation 502, the processor 204 may access the operating support system 210. Once the operating support system 210 is accessed, the processor 204 may retrieve additional information associated with the customer network from the operating support system 210. The additional information associated with the customer network may be retrieved based on the received user populated data, such as the customer identifier. The additional information may include, but is not limited to, customer site information, network service details for the customer, customer address and name, customer network provisioning details, software and hardware details of the network devices involved in providing the network service to the customer, and the like.

In one embodiment, where data representative of the type of network test is absent, the processor 204 may automatically select a network test that is appropriate for the customer, based on the additional information. Responsive to retrieving the additional information and the type of network test to be performed (as selected by the user or as determined by the networking testing server), the scheduler engine 206 determines if any test point 196-198 is available to execute the network test. The test point 196-198 may be selected based on the type of network test to be performed and the customer information (e.g., additional information). Further, the scheduler engine 206 schedules the network test based on the availability of the test points 196-198.

As described above in association with FIG. 2, the scheduler engine 206 may maintain a table comprising a list of test points 196-198. Further, the scheduler engine 206 may maintain a status of each of the test points 196-198. Using the table, the scheduler engine 206 may assign network test requests to each test point based on the status of the test point. In one embodiment, the scheduler engine 206 may distribute the network tests between the different test points such that the test points are not overloaded i.e., the scheduler engine 206 can operate as a load balancer for the test points. Further, the scheduler engine 206 can distribute one network test between multiple test points to reduce dependency on a single test point. In addition to the table comprising the list of test points, the scheduler engine 206 may maintain a mapping table that provides a mapping of network tests to test points i.e., information on which network test is assigned to which test point. In an additional embodiment, the schedule engine 206 can maintain one or more queues for the network test requests. The scheduler engine 206 can prioritize the queues based on one or more criteria. Example of the criteria can include, but is not limited to, the complexity of the network tests, the resources that need to be allotted for the network test, the type of network tests, the customer for which the network test is to be conducted, and the like.

In one embodiment, in operation 504, the scheduler engine 206 selects a tests point from one or more test points 196-198 based on one or more of the above-described criteria. Once a test point has been selected, in operation 506 the scheduler engine 206 determines if the selected test point is busy executing other tests. If the selected test point is busy, in operation 510 the scheduler engine 206 selects another test point from one or more test points 196-198 and continues to do so till an available test point is identified. In other words, when none of the test points are available, the scheduler engine 206 may wait for the next available test point 196-198. If the selected test point is not busy i.e., the selected test point is available to execute the network test, then the network testing server 102 returns to operation 308.

Referring back to FIG. 3, in operation 308, responsive to identifying an available test point 196-198, the scheduler engine 206 communicates with the import/export engine 212 to reconfigure the available test point into the customer network at which the network test is to be performed. As described above, the test points may be operating in a private network that is separate from the private customer network where the network test is to be executed. So the available test point (e.g., test point 196-198) may have to be reconfigured such that the test point is made a part of the customer private network. The reconfiguration process of operation 308 is described below in further detail, in association with the description of FIG. 6.

Figure 6:
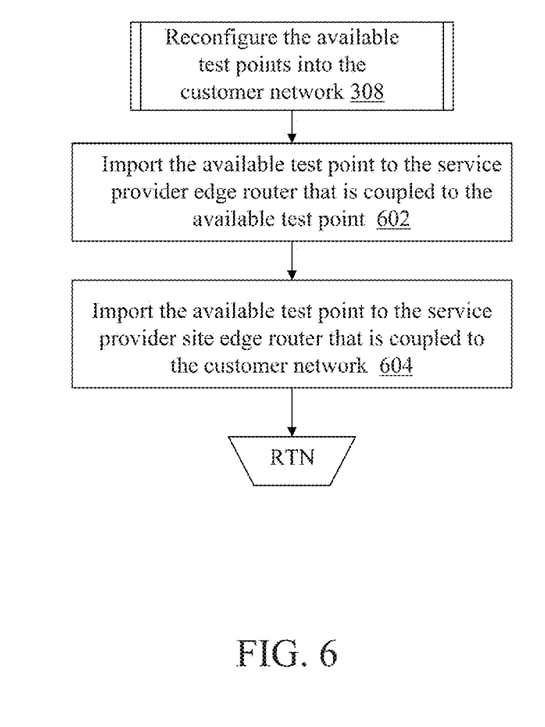
FIG. 6 is a flow chart that illustrates a process of reconfiguring test points into a customer network, according to certain exemplary embodiments of the present invention.

Turning to FIG. 6, FIG. 6 is a flow chart that illustrates a process of reconfiguring test points into a customer network, according to certain exemplary embodiments of the present invention. Describing the operation of the import/export engine, in an exemplary embodiment, the customer private network may be identified as VPN 1 and the private network of the test point 198 may be identified as VPN T2. Continuing with the example, all the routes associated with VPN 1 may be distinguished by a VPN identifier, such as a route distinguisher (RD). Further, the routes associated with VPN 1 at the headquarters site 160 may be shared with the branch site 162 which may be a member of VPN 1 target community. The routes distinguished by the RD associated with VPN 1 may be distributed only within the sites that are represented as members of VPN 1 target community. Therefore, these routes may not be shared with the test point 198 which is associated with a different VPN i.e., VPN T2. However, when a test point (e.g., test point 198) is identified as available to execute a network test, the test point 198 and a computer device in the customer network against with the network is tested may have to communicate with each other.

To establish communication from devices in VPN T2 (e.g., test point 198) to devices in VPN 1, in operation 602, the import/export engine 212 can issue a command or send a signal to a PE device 110 to which the test point 198 at VPN T2 is coupled, instructing the PE device 110 to import a routing table or a routing table entry from the PE device 104 to which the VPN 1 is coupled. Further, to establish communication from devices in VPN 1 to devices in VPN T2, in operation 604, the import/export engine 212 can issue an instruction or send a signal instructing the PE device 104 to which the VPN 1 is coupled to import a routing table or a routing table entry from the PE device 110. In another embodiment, the import/export engine 212 can issue an instruction or send a signal instructing the PE device 110 to export a routing table or a routing table entry from the PE device 110 to the PE device 104. In other words, the import/export engine 212 may coordinate the exchange of routing information between the different VPNs. In one embodiment, an import command may be used to import routing information from a target VPN extended community. Similarly, an export command may be used to export routing information to the target VPN extended community. Once the VPNs have exchanged routing information with each other, the VPNs can establish communication with each other. In one example embodiment, the instructions or signals issued by the import/export engine 212 may include an address of the PE devices associated with each VPN between which communication is to be established.

Once the communication between the VPNs have been established i.e., once the test point has been reconfigured into the customer network, then process of automated testing may proceed to operation 308 of FIG. 3.

Referring back to FIG. 3, in operation 308, once the test point has been reconfigured into the customer network, the network testing server 102 may issue instructions to the test point 196-198 to execute the network test that is chosen for the customer network. Responsive to receiving the instructions from the network testing server 102, the test point (e.g., one of the test points 196-198) may execute a network test, wherein the test point may generate a simulated traffic between the PE device 110 and the PE device 104. In another embodiment, the simulated traffic may be generated between PE device 110 and a computing device (e.g., responder device) coupled to a customer site LAN router. One or ordinary skill in the art can understand and appreciate that using the network testing server 102, any leg of the network can be tested, such as the first mile, last mile, site to site, and the like.

Once the network test is completed, in operation 310, the input/output interface engine 208 of the network testing server 102 may receive a result of the network test from the test point. Upon receiving the network test result, the input/output interface engine 208 may forward the result to the statistics engine 214. The statistics engine 214 may analyze the result and generate network performance statistics based on the result. Further, the statistics engine 214 can generate suggestions to be presented to the user based on analyzing the results. For example, the statistics model can generate a next step instruction for the user. After analysis, the network performance statistics may be forwarded to the display engine 216. The display engine 206 may access the memory 202 to retrieve a user specified presentation format, if any. Further, based on the user specified presentation format, if any, the display engine 216 may format the result to present the result to the user via the web interface. In some embodiments, the display engine may present the result obtained directly from the test point without formatting it. In an additional embodiment, the network testing server 102 may save any appropriate test results associated with a customer network for future reference. The test result and user desired settings may be saved in a database. The database may either be internal to the network testing server 102 or external to the network testing server 102 and accessed by a network connection. The process of the automated network testing ends with operation 314.

Figure 7:
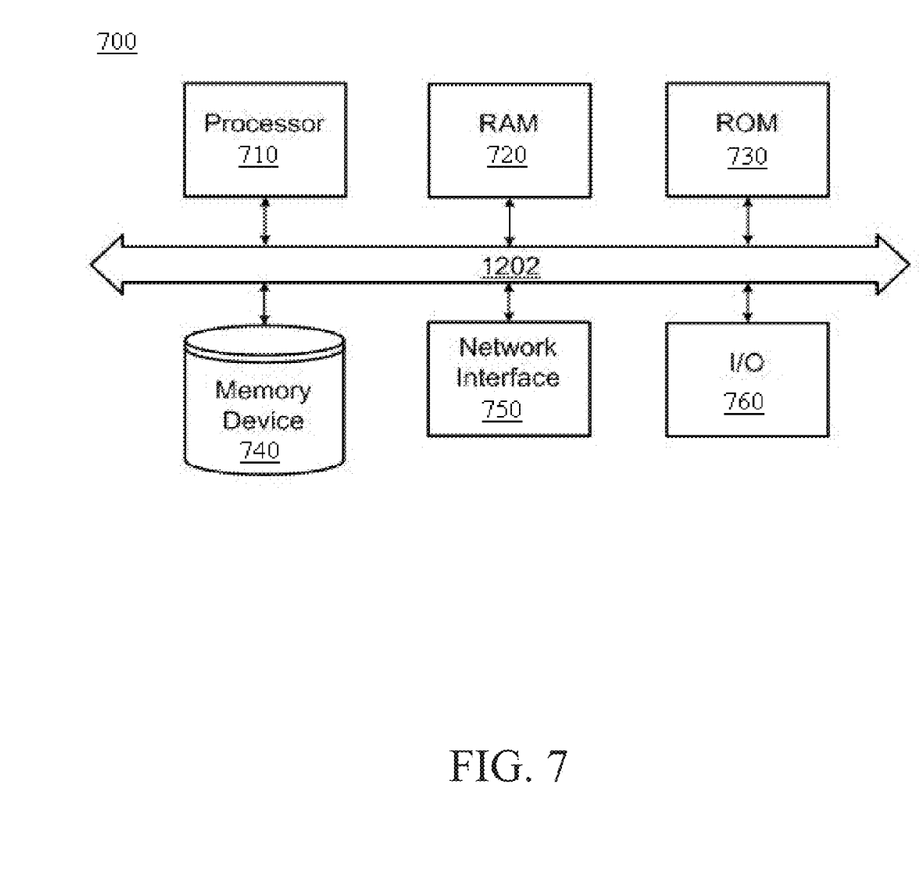
FIG. 7 illustrates an example hardware diagram of a general purpose computer 700, according to certain exemplary embodiments of the present invention.

Turning to FIG. 7, FIG. 7 illustrates an example hardware diagram of a general purpose computer 1200, according to certain exemplary embodiments of the present invention. The server 102, the customer edge device 104, provider edge device 106, provider device 108, and the remote computing device 180 may be implemented using combinations of one or more of the elements of the general purpose computer 700. The computer 700 includes a processor 710, a Random Access Memory (RAM) 720, a Read Only Memory (ROM) 730, a memory (i.e., storage) device 740, a network interface 750, and an Input Output (I/O) interface 760. The elements of the computer 700 are communicatively coupled via a bus 702.

The processor 710 comprises any well-known general purpose arithmetic processor. Both the RAM 720 and the ROM 730 comprise well known random access and read only memory devices, respectively, that store computer-readable instructions to be executed by the processor 710. The memory device 740 stores computer-readable instructions thereon that, when executed by the processor 710, direct the processor 710 to execute various aspects of the present invention described herein. As a non-limiting example group, the memory device 740 may comprise one or more of an optical disc, a magnetic disc, a semiconductor memory (i.e., a flash based memory), a magnetic tape memory, a removable memory, combinations thereof, or any other well-known memory means for storing computer-readable instructions. The I/O interface 760 comprises device input and output interfaces such as keyboard, pointing device, display, communication, and other interfaces. The bus 702 electrically and communicatively couples the processor 710, the RAM 720, the ROM 730, the memory device 740, the network interface 750, and the I/O interface 760, so that data and instructions may be communicated among the processor 710, the RAM 1220, the ROM 730, the memory device 740, the network interface 750, and the I/O interface 760. In operation, the processor 710 is configured to retrieve computer-readable instructions stored on the memory device 740, the ROM 730, or another storage means, and copy the computer-readable instructions to the RAM 720 for execution. The processor 710 is further configured to execute the computer-readable instructions to implement various aspects and features of the present invention described herein.

In an example embodiment, business entity ABC, Inc. (herein company ABC) may have a headquarters branch in New York and one or more branch sites located in Atlanta and San Francisco. The company ABC may request service provider X for a 10 Mbps network connection, with a guaranteed voice data throughput of 5 Mbps. Based on the request, the service provider X may provision the network to provide company ABC with the desired network services. Before initiating the service, the service provider X may need to test whether the network as provisioned by the service provider X matches Company ABCs requirements.

The service provider X may have 'n' test points deployed all over the service provider's network. Further, the service provider X may have a network testing server 102 that can be accessed using a remote computing device. In the example embodiment, technician John Doe may be assigned to perform network tests to determine if the network provisioning matches the specifications of Company ABC.

Upon being assigned to perform the network test, John Doe may access the network testing server 102 via a web page using John Doe's mobile phone. In another embodiment, John Doe's mobile phone may have an application Y associated with the network testing server 102. In one embodiment, application Y may be a client instance of the network testing server 102 that can be downloaded from the network testing server. John Doe may open the application Y and upon opening the application Y, John Doe may be provided with a web interface through which John Doe can access the network testing server 102. The web interface may include a data field to enter an IP address of a responder computer device located in the customer network, a data field to enter a unique customer identifier, a data field to enter a type of network test to be performed. In some embodiments, the web interface may not include a data field to enter the type of network test, rather the type of network test will be determined by the network testing server 102 based on the customer identifier. In addition to the above-mentioned data fields, the web interface may include menu options to login to any one or the 25 test points, menu options to control the network test, menu options to edit the result of the network test, and/or menu options to determine a user's presentation preference for how the result is to be presented.

In an additional embodiment, application Y upon opening may gather location information from the mobile phone (e.g., host system), wherein the mobile phone may be configured to determine location information. Further, the application may transmit the location information to the network testing server 102. Using the location information, the network testing server 102 may retrieve a list of customer network identifiers and customer network information in and around the location transmitted by the application. The customer network identifiers and customer network information of the customers in the vicinity of the location may be retrieved from the operational support system. For example, if John Doe is at a customer premise, the application Y will retrieve the location information from the mobile phone and transmit the location information to the network testing server 102. Further, the network testing server 102 may transmit a list of customer identifiers and customer network information of customers in the vicinity, such as company ABC. Further, the list may be sorted and organized in a hierarchy based on a preset criterion such as newly provisioned customers to be listed first, or customers with the largest infrastructure to be listed first, or customers providing the most business to the service provider to be listed first, and the like. The criteria may be preset by John Doe. Further, once the list is available, John Doe may select a customer network from the list of customers and all the data fields may be auto populated. In other embodiment, John Doe may have to manually enter the customer identifier.

Continuing with the example, once John Doe opens the application Y and is presented with a web interface, John Doe may enter the customer identifier, the IP address of the responder computer, and/or the type of network test in the respective data fields. In some embodiments, once the customer identifier is entered, John Doe may be prompted with a pop up that includes a list of network tests that are specific to the customer associated with the customer identifier. Further, John Doe can choose a network test from the list presented to John Doe. In some other embodiments, once the customer identifier is entered, John Doe may be informed that the network test server 102 has determined a list of network tests for the customer and is going to automatically execute the network tests i.e., John Doe does not have to make any selections for the network test.

Once John Doe has filled out the data fields, the inputs entered into the data fields may be forwarded to the network testing server 102. In some embodiments, the web interface may include a "Submit" button and the inputs entered into the data fields may be forwarded to the network testing server 102 upon clicking the submit button.

At the network testing server 102, the inputs may be received at the input/output interface engine 208. In one embodiment, the input/output interface engine 208 can save the inputs in a database and then process the inputs to identify data that is relevant to conducting the network test. Further, the input/output interface engine 208 may forward the processed data to the processor 204, which in turn access the operating support system 210 to retrieve additional information associated with the customer network. Based on the additional information and the type of network test to be conducted, the processor 204 in association with the scheduler engine 206 identifies a test point that is available to execute the network test.

Once the test point is identified and determined that the test point is available, the scheduler engine 206 informs the import/export engine 212. In turn, the import/export engine 212 reconfigures the available test point into the customer private network. Then, the network testing server 102 instructs the test point to execute the network test. Upon receiving the instruction, the available test point simulates traffic such as a call to the responder computer and receives a response from the responder computer. Once the network test is completed, the test point transmits the results to the network testing server 102.

Once the network testing server 102 receives the result, the result may be forwarded to the statistics engine 214. The statistics engine 214 may process the result, analyze the result, interpret the result and generate suggestions for John Doe based on the result. Further, the statistics engine 214 may generate network statistics and/or diagnostics data for the customer network. Further, all the results are forwarded to the display engine and in addition, the results are stored in a database. The display engine 216 may format the result and organize the results based on John Doe's presentation preference. John Doe may have chosen to receive the result in the form of a report including charts and suggestions about the next step. The display engine 214 may access a database to search for any results associated with the customer conducted at a pervious time. Further, the display engine 216 may combine the previous results with the current results and present the combined result or a comparison of the results to John Doe. The results may be presented an a manner that is easy to understand, for example, the results if critical may be highlighted as red, or if the results are favorable they may be highlighted in green and so on. In other words, the display engine 216 may use different presentation combinations to present the network test results in a comprehensible manner. Further, the results may be presented in an interactive format as well.

In an additional embodiment, once the results are presented to John Doe on the mobile phone, the network testing server 102 may also transmit a list of users to which John Doe may want to forward the presented result. For example, John Doe may be provided with a list of other technicians associated with the service provider, such as a senior technical specialist, a field engineer, or the like. The list may be sorted and organized hierarchically based on an employment title of the user, the experience of the user, number of cases resolved by the user, etc. Further, the application Y may be configured to automatically forward the result to one or more users. Once presented with the list of users, John Doe may choose a user from the list to forward the result to. For example, John Doe may escalate the result to a senior technical depending on the result. In another embodiment, application Y may suggest escalating the results to a senior technician and provide contact details for the senior technician. John Doe can use gestures or tactile action to forward the network test results to one or more of the users in the list.

In another additional embodiment, the web interface may provide an option to identify the skill level of John Doe. For example, if John Doe is highly experienced and well versed with the network tests, then the results presented to John Doe may be designed for the level of understanding of a highly experienced technician. However, if John Doe has no experience in network testing, the network test results may be simplified for the understanding of a less skilled technician. Further, the network testing server 102 may provide direct access or a hyperlink access to a technical support database that can guide the less skilled or highly skilled technician through the steps that are to be followed consequent to receiving the network test result.

In yet another embodiment, one or more users can access application Y from their respective computing devices and can simultaneously view the network testing parameters, network testing simulation and results. Further, the web interface may provide option to chat, send messages or emails while the network test is being executed or after the results are obtained in near real-time.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
receiving, by a computer from a user, a first user input representative of a customer network identifier associated with a network test, wherein the customer network identifier identifies a customer network that is a first virtual private network (VPN);
receiving, by the computer from the user, a second user input representative of a type of network test to be performed;
receiving, by the computer from the user, a third user input representative of a skill level of the user;
based on the first user input and the second user input, identifying, by the computer, a test point that is available to perform the network test from a plurality of test points, wherein each test point of the plurality of test points is located in its respective VPN that is distinct from each other and from the first VPN, wherein the identified test point is located in a second VPN;
reconfiguring, by the computer, the available test point that is located in the second VPN to be a part of the first VPN;
instructing, by the computer, the reconfigured test point to perform the network test;
presenting, by the computer, a progress of the network test to the user;
receiving, by the computer, a result of the network test from the reconfigured test point;
adjusting, by the computer, a granularity of the result of the network test based on the skill level of the user; and
presenting, by the computer, the adjusted result of the network test to the user.

2. The method of claim 1, further comprising determining, by the computer, the type of network test based on the first user input.

3. The method of claim 1, wherein identifying the available test point comprises:
accessing, by the computer, a provisioning database;
retrieving from the provisioning database, by the computer, information regarding a service provider edge device that is coupled to the first VPN based on the first user input, wherein the service provider edge device is an edge router; and
selecting, by the computer, the test point based on the information retrieved from the provisioning database.

4. The method of claim 1, wherein reconfiguring the available test point to be a part of the first VPN comprises:
exchanging routing information, by the computer, between the service provider edge device coupled to the first VPN and another service provider edge device coupled to the available test point located in the second VPN.

5. The method of claim 4, further comprising:
transmitting, by the computer, a signal to the service provider edge device coupled to the first VPN instructing the service provider edge device to:
import routing information from the other service provider edge device that is coupled to the available test point located in the second VPN, and
export routing information from the service provider edge device coupled to the first VPN to the other service provider edge device coupled to the available test point located in the second VPN.

6. The method of claim 4, further comprising:
transmitting, by the computer, another signal to the other service provider edge device instructing the other service provider edge device to:
import routing information from the service provider edge device that is coupled to the first VPN, and export routing information from the other service provider edge device coupled to the available test point located in the second VPN to the service provider edge device coupled to the first VPN.

7. The method of claim 1, further comprising scheduling, by the computer, the network test based on an availability of the test point.

8. A system, comprising:
a computer configured to:
receive, from a user, a first user input representative of a customer network identifier associated with a network test, wherein the customer network identifier identifies a customer network that is a first virtual private network (VPN);
receive, from the user, a second user input representative of a type of network test to be performed;
receive, from the user, a third user input representative of a skill level of the user;
create and maintain a mapping table that provides a mapping of each of a plurality of test points to a current network test assigned to the respective test point, wherein each test point of the plurality of test points is located in its respective VPN that is distinct from each other and from the first VPN;
based on the first user input and the second user input and the mapping table, identify a test point that is currently available to perform the network test from a plurality of test points, wherein the identified test point is located in a second VPN;
reconfigure the available test point located in the second VPN to be a part of the first VPN;
instruct the reconfigured test point to perform the network test;
receive an output representative of a result of the network test from the reconfigured test point;
adjust a granularity of the result of the network test based on the skill level of the user; and
present the output representative of the adjusted result to the user.

9. The system of claim 8, wherein the computer is configured to determine the type of network test based on the first user input.

10. The system of claim 8, wherein to identify the available test point the computer is configured to:
retrieve from a provisioning database information regarding a service provider edge device that is coupled to the first VPN based on the first user input, wherein the service provider edge device is an edge router; and
select the test point based on the information retrieved from the provisioning database.

11. The system of claim 8, wherein to reconfigure the available test point to be a part of the customer network, the computer is configured to exchange routing information between the service provider edge device coupled to the first VPN and another service provider edge device coupled to the available test point located in the second VPN.

12. The system of claim 8, wherein the computer is configured to schedule the network test based on an availability of the test point that is determined using the mapping table.

13. A computer, comprising:
a memory; and
a processor configured to:
receive, from a user, a first user input representative of a customer network identifier associated with a network test, wherein the customer network identifier identifies a customer network that is a first virtual private network (VPN);
receive, from the user, a second user input representative of a skill level of the user;
determine a type of network test to be performed based on the first user input;
based on the first user input and the type of network test, identify a test point that is available to perform the network test from a plurality of test points, wherein each test point of the plurality of test points is located in its respective VPN that is distinct from each other and from the first VPN, wherein the identified test point is located in a second VPN;
reconfigure the available test point that is located in the second VPN to be a part of the first VPN;
instruct the reconfigured test point to perform the network test;
present a progress of the network test to the user;
receive a result of the network test from the reconfigured test point;
adjust a granularity of the result of the network test based on the skill level of the user;
present the adjusted result of the network test at each point of progress of the network test to the user; and
generate a suggestion associated with the result by analyzing the result associated with the network test, wherein the suggestion is representative of subsequent steps that are to be followed based on the result of the network test.

14. The computer of claim 13, wherein the processor is configured to:
transmit a signal to a service provider edge device coupled to the first VPN instructing the service provider edge device to:
import routing information from another service provider edge device that is coupled to the available test point located in the second VPN, and
export routing information from the service provider edge device coupled to the first VPN to the other service provider edge device coupled to the available test point located in the second VPN.

15. The computer of claim 13, wherein the processor is configured to schedule a network test based on the availability of the test point.

16. The computer of claim 13, wherein the processor is configured to schedule a network test based on the type of network test.

17. The computer of claim 13, wherein the processor is configured to schedule a network test based on the customer network identifier.

18. The computer of claim 13, wherein the processor is further configured to:
receive a location of a mobile computing device associated with the user;
responsively, present a list of customer networks in a proximity of the location of mobile computing device;
prompt the user to select at least one customer network associated with the network test.

19. The method of claim 1, further comprising:
responsive to presenting the result of the network test at each point of progress of the network test to the user, presenting, by the computer, a list of other users to which the user may escalate or forward the presented result of the network test.

20. The method of claim 1, further comprising:
presenting, by the computer, an option to the user to transmit and receive messages from one or more other users while the network test is being executed or after presenting the result of the network test.

\* \* \* \* \*